United States Patent
Lee et al.

(10) Patent No.: US 6,970,606 B2
(45) Date of Patent: Nov. 29, 2005

(54) AUTOMATIC IMAGE QUALITY EVALUATION AND CORRECTION TECHNIQUE FOR DIGITIZED AND THRESHOLDED DOCUMENT IMAGES

(75) Inventors: Yongchun Lee, Rochester, NY (US); George O. Simmons, North Greece, NY (US)

(73) Assignee: Eastman Kodak Company, Rochester, NY (US)

( * ) Notice: Subject to any disclaimer, the term of this patent is extended or adjusted under 35 U.S.C. 154(b) by 640 days.

(21) Appl. No.: 10/050,206

(22) Filed: Jan. 16, 2002

(65) Prior Publication Data

US 2003/0133623 A1 Jul. 17, 2003

(51) Int. Cl.[7] .............................................. G06K 9/38
(52) U.S. Cl. .................. 382/270; 382/274; 382/275; 358/3.03; 358/3.26
(58) Field of Search ......................... 382/252, 260, 382/261, 270, 274, 275; 358/3.26, 3.27, 463, 358/464, 465

(56) References Cited

U.S. PATENT DOCUMENTS

| | | | |
|---|---|---|---|
| 4,982,294 A | | 1/1991 | Morton et al. |
| 5,185,674 A | * | 2/1993 | Tai .............................. 358/3.07 |
| 5,208,871 A | * | 5/1993 | Eschbach ..................... 382/252 |
| 5,583,659 A | | 12/1996 | Lee et al. |
| 5,778,092 A | * | 7/1998 | MacLeod et al. ........... 382/176 |
| 5,832,140 A | * | 11/1998 | Stapleton et al. ........... 382/298 |
| 5,915,037 A | | 6/1999 | Weber et al. |
| 5,974,199 A | | 10/1999 | Lee et al. |
| 6,674,900 B1 | * | 1/2004 | Ma et al. ..................... 382/176 |

FOREIGN PATENT DOCUMENTS

DE 195 36 170 A1 3/1997

* cited by examiner

Primary Examiner—Bhavesh M. Mehta
Assistant Examiner—Yosef Kassa
(74) Attorney, Agent, or Firm—Nelson Adrian Blish

(57) ABSTRACT

A process and system for automating the image quality inspection and correction for scanned document which previously required a human operator. For every scanned and thresholded image, the process and system performs an automatic evaluation through a binary image quality detection system which generates an image noise index indicative of the amount of image artifacts or image loss. When a poor quality scanned page is detected, for example, too much speckle noise, the gray scale image is retrieved or the image is rescanned. The gray scale image then automatically undergoes an image quality correction process to produce a clean, readable binary image.

8 Claims, 15 Drawing Sheets

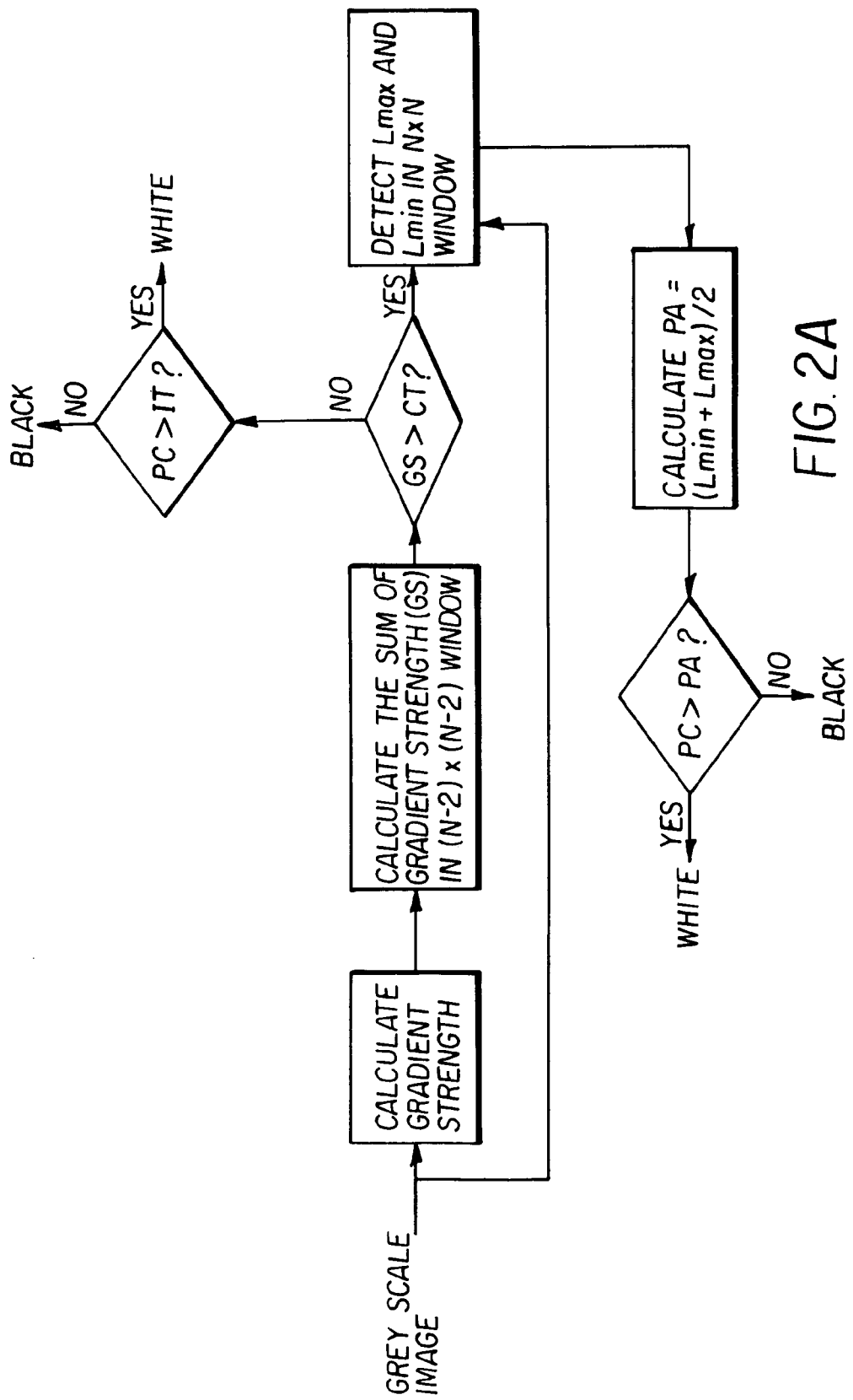

NB=20  NW=10  NA=20*Na
R =NA/DA

Na=AVERAGE NOISE SIZE

| I= | 1 | 2 | 3 | 4 | 5 | 6 | 7 | 8 | 9 | 10 |
|---|---|---|---|---|---|---|---|---|---|---|
| CT(I)  IT(J) | 60 | 55 | 50 | 45 | 40 | 35 | 30 | 25 | 20 | 15 |
| J=1  70 | R(60,70) | R(55,70) | R(50,70) | R(45,70) | R(40,70) | R(35,70) | R(30,70) | R(25,70) | R(20,70) | R(15,70) |
| 2  100 | R(60,100) | | | | | | | | | |
| 3  130 | R(60,130) | | | | | | | | | |
| 4  160 | R(60,160) | | | | | | | | | |
| 5  190 | R(60,190) | | | | | | | | | |
| 6  220 | R(60,220) | | | | | | | | | |

FIG. 4C

AUTOMATIC IMAGE QUALITY EVALUATION AND CORRECTION TECHNIQUE FOR DIGITIZED AND THRESHOLDED DOCUMENT IMAGES

FIELD OF THE INVENTION

The invention relates to a process and system for automating the image quality inspection and correction for scanned documents which previously required a human operator. The process and system for each and every scanned and thresholded image performs an automatic evaluation through a binary image quality detection system which generates an image noise index indicative of the amount of image artifacts or image loss. When a poor quality scanned page is detected, e.g., too much speckle noise is present, the gray scale image is retrieved or the image is rescanned in gray scale. The gray scale image then automatically undergoes an image quality correction process to produce a clean, readable binary image.

BACKGROUND OF THE INVENTION

In a production scanning environment, the digital output of a scanned paper document is often represented and stored in binary (Black and White) form because of greater efficiency in storage and transmission, particularly for textual images. The capture of a binary image requires an image thresholding process installed in a scanner, which converts digital gray scale signals captured by a CCD sensor (usually, 8 bits per pixel) into binary signals (1 bit per pixel). Since an image thresholding is an image data reduction process, it often results in unwanted image artifacts or image information loss, such as speckle noises in the document background or loss of low contrast characters. In the prior art, there are numerous adaptive thresholding techniques for producing an optimal quality binary image. However, an adaptive thresholding technique has yet to be found that automatically produces a clean, readable binary image for every captured gray scale image in a batch of paper documents due to variations of paper background and content. As a result, the production document scanning often requires intensive labor in the form of visual image quality inspection warranting that every captured binary image is readable.

Clearly, there is a need for an improved scanning system and process that is capable of producing a clean, readable binary image of text or the like without the need for a visual image quality inspection. Ideally, such a system and process would be sufficiently compatible with presently available scanning components to allow the use of the system on scanners presently in use, and to minimize the need for the design and manufacture of new components.

SUMMARY OF THE INVENTION

The invention is an image processing system and process that automates the image quality inspection and correction previously performed by a human operator. The image quality of every scanned and thresholded image is automatically evaluated by a binary image quality detection system that generates an image noise index for every image. When the image noise index indicates a poor image, such as too much speckle noise in background, the gray scale image is retrieved or the document is re-scanned in gray scale. An image quality correction process is automatically applied to the gray scale image to produce a corrected, clean, and readable binary image.

It is an object of the present invention to automatically index image noise level for a thresholded image which is generated by a multi-windowing technique for thresholding an image using local image properties in real time. For every thresholded image having high image noise index, an image quality correction scheme is applied to the problematic document and produces an optimal binary image quality in post processing. The design of the system allows performing high speed image quality inspection while retaining optimal image quality output without operational interruption in high speed document scanning environment.

The image processing system comprises two image processing components: a binary image quality inspection component for evaluation of image noise level and a multiple adaptive thresholding image processing component for correction of image quality. The binary image quality inspection component evaluates the noise level of a thresholded image and takes the noise level as an index of image quality. When the noise level is greater than a specified threshold the image is considered as poor image quality. For every poor thresholded image, its original gray scale image is retrieved if available, otherwise the original document is recaptured in gray scale. The correction of image quality is made by feeding the gray scale image into a multiple adaptive thresholding processor. The multiple adaptive thresholding technique comprises two iterative image processing steps: adaptive image thresholding and binary image analysis. The iteration proceeds until an optimal binary image is found. An optimal binary image means an image having clean background and readable text.

The invention and its objects and advantages will become more apparent in the detailed description of the preferred embodiment presented below.

BRIEF DESCRIPTION OF THE DRAWINGS

FIG. 2A shows the block diagram of the Multi-windowing technique for thresholding an image using local image properties.

FIG. 4C is the table containing the calculated noise levels for different thresholded images produced by various input parameters (contrast threshold (CT), intensity threshold (IT)).

FIG. 4I is an example of noise index distribution (R(CT, IT)) with constant intensity threshold (IT) at 60 and multiple contrast thresholds (CT) varied from 70 to 220.

DETAILED DESCRIPTION OF THE INVENTION

Figure 1:
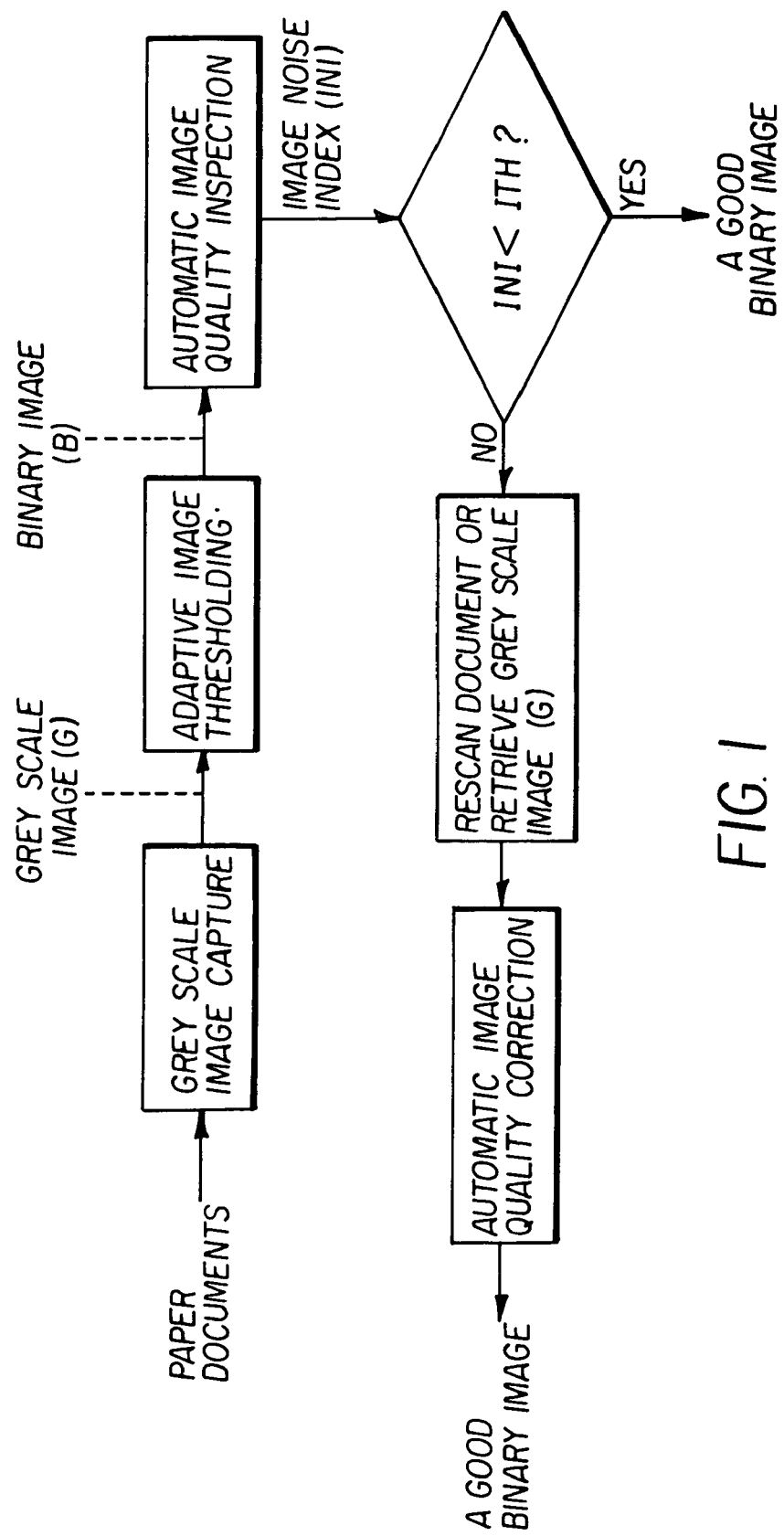
FIG. 1 shows the block diagram of the image processing for automatic image quqlity inspection and correction in a scanning system.

FIG. 1 depicts the block diagram of a digital image processing system which automatically inspects the image quality of every thresholded image. For a poor thresholded image obtained from the image quality inspection, an image quality correction process is then initiated to search for optimal threshold parameters in order to obtain a legible and clean binary image. The image processing system comprises the following steps: (1) a paper document is digitally captured in gray scale which typically contain 8 bits per pixel; (2) the capture gray scale image (G) is fed through an adaptive image thresholding module to convert the gray scale image into a binary image (B); (3) the binary image is run through an image quality inspection and an image noise index (INI) is generated from the inspection; (4) the INI value determines the level of image quality, and the image quality is classified as poor when the INI value is greater than a predetermined threshold (ITH); (5) for a low quality image, an image quality correction is applied to the gray scale image in order to produce a legible, clean binary image. The detail of each image processing module is described in the following:

Adaptive Image Threshold

Figure 2B:
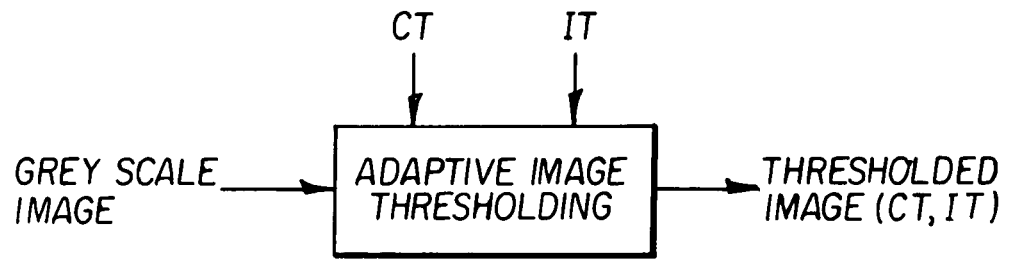
FIG. 2B illustrates the image quality of a thresholded image controlled by the input threshold parameters (contrast threshold (CT), intensity threshold (IT)).
Figure 2C:
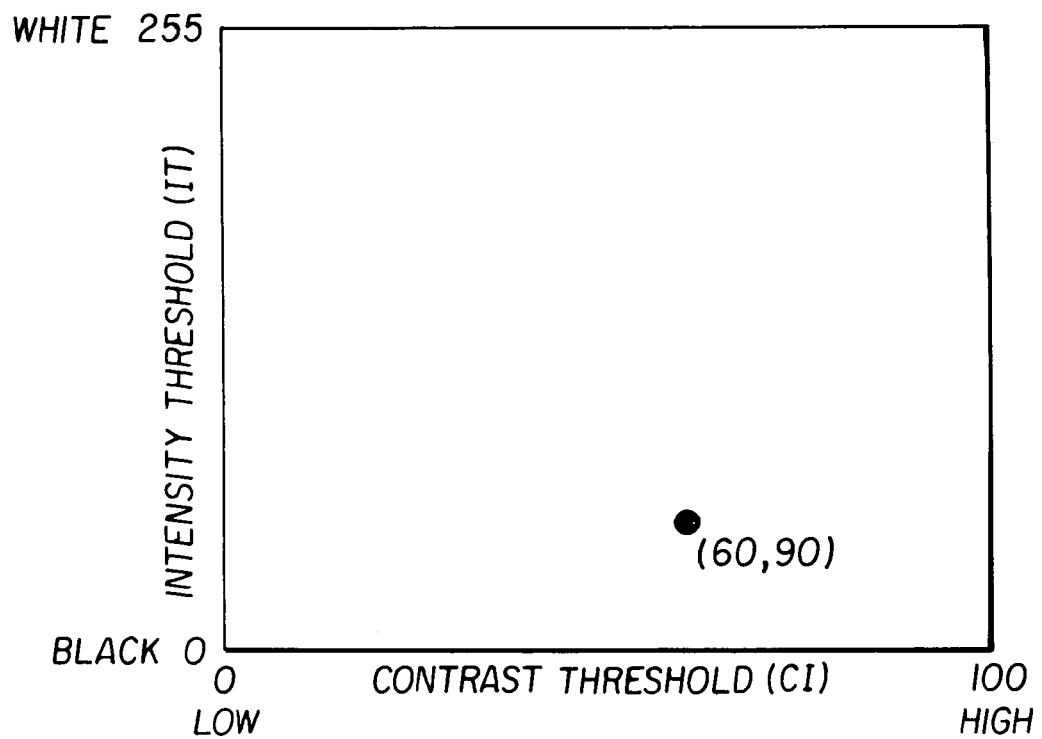
FIG. 2C illustrates the relationship of the two input parameters (contrast threshold, intensity threshold) and the sensitivity of thresholding.

The multi-windowing technique for thresholding an image using local image properties as described in U.S. Pat. No. 5,583,659, the disclosure of which is hereby incorporated by reference, is applied to convert a gray scale image into a binary image. The thresholding technique calculates the threshold value for every pixel in an image based on the local image properties surrounding the pixel. The threshold value is then applied to turn the gray value of a pixel into bi-level value (black or white). The block diagram of the thresholding technique is summarized in FIG. 2A. The operation of the technique requires a user to supply a contrast threshold value (CT) and an intensity threshold value (IT) as shown in FIG. 2B. The image quality of a thresholded image is determined by the input of the two threshold values (CT and IT). A thresholded image (CT, IT) as shown in FIG. 2B means that the image quality of a thresholded image is a function of(CT, IT). The image quality of a thresholded image is evaluated by two factors: text readability (no image information loss) and smoothness of the white background (noise free on image background). The CT value controls the sensitivity of detecting thin, light text and line arts, and the it value accounts for the threshold of a uniform gray region. Assume that the CT value is normalized to the values in the range of 0 and 100 and the it value is between 0 and 255 as shown in FIG. 2C. The CT value is often chosen to be sensitive enough for extracting all image information such as light text, thin lines, . . . etc., and the IT value is set to turn light gray uniform region into white background. The threshold values at (CT=60, IT=90) as shown in FIG. 2C is considered as an appropriate setup to extract all image information details. However, the setup of the threshold values at (CT=60, IT=90) may result in too sensitive for some documents due to the roughness of document papers and results in generating unwanted speckle noises in background of the thresholded images. The following section describes the method of automatic image noise inspection.

Automatic Image Noise Inspection

As mentioned above, the CT value supplied to the thresholding technique is always set to be sensitive enough to extract all image information details so that the text readability is no longer an issue to be concerned in image quality evaluation. The evaluation of image quality is simplified to the detection of background noises in the thresholded image.

Figure 3A:
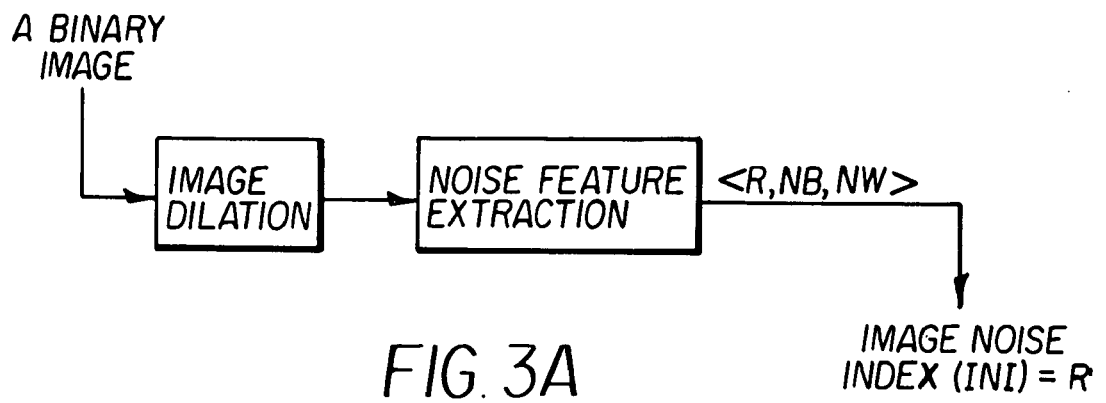
FIG. 3A shows the image processing steps of automatic image quality inspection for a bitone image.

FIG. 3A is the processing steps of detecting noise level for a thresholded image. A binary image dilation operation is applied to the binary image (B) and generates a new binary image (B1). Three noise features are measured from the dilated binary image (B1). The normalized noise area (R) is taken as the image noise index (INI) of the binary image (B). The detailed description of the processing steps as shown in FIG. 3A is stated in the following.

Figure 3B:
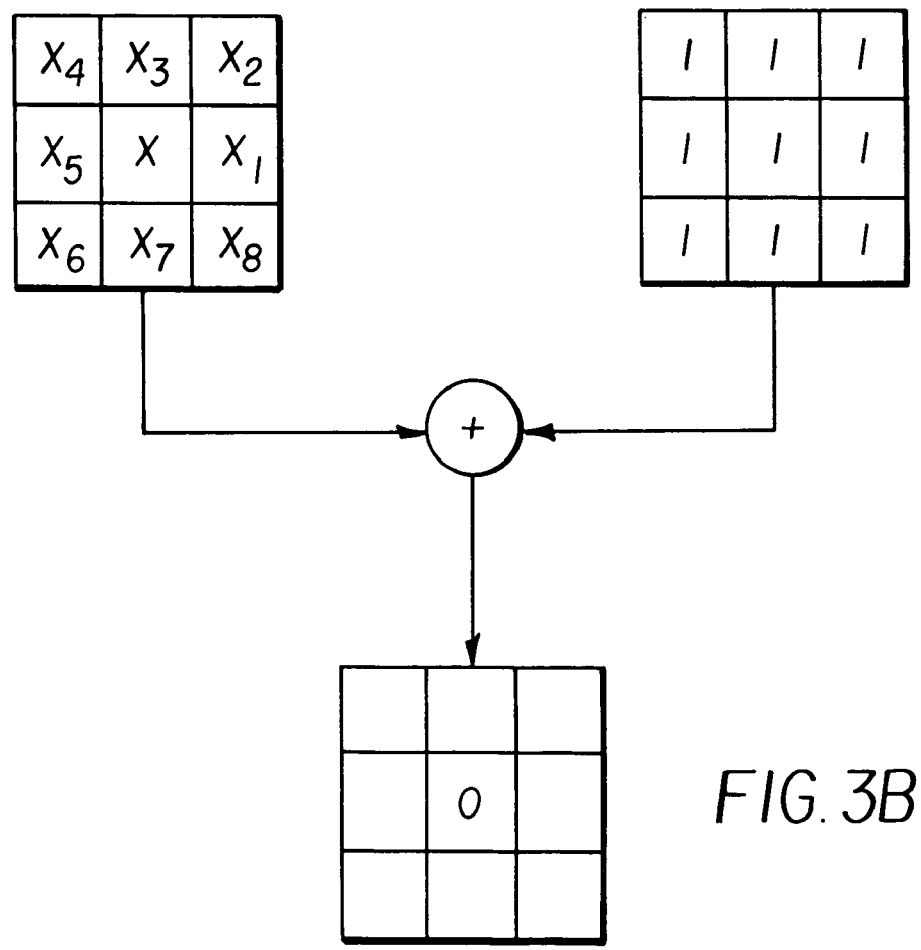
FIG. 3B shows the neighborhood operation of binary image dilation.
Figure 3C:
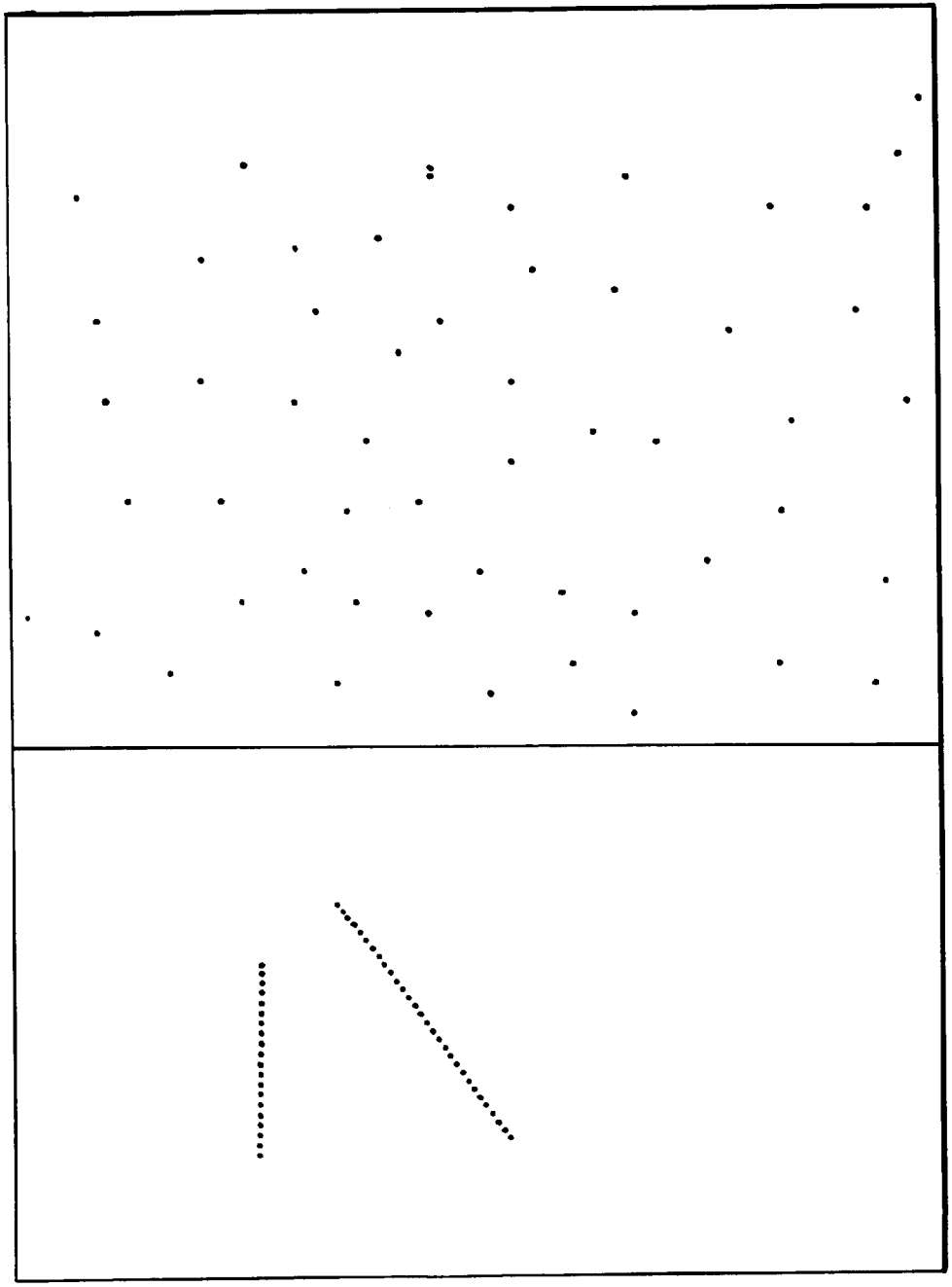
FIG. 3C is an example of noise dot structures before image dilation in a binary image.
Figure 3D:
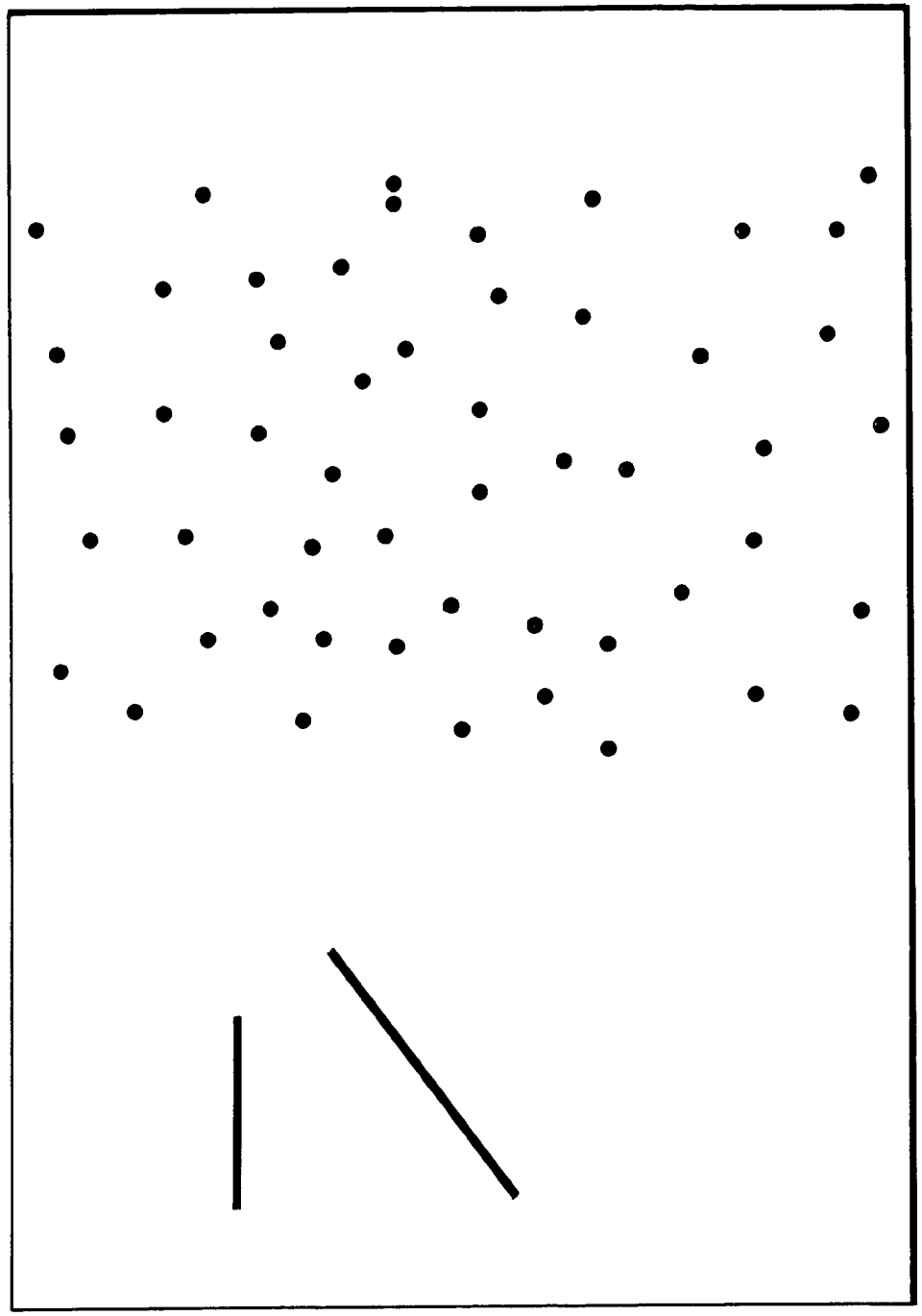
FIG. 3D is the noise dot structures of FIG. 3B after image dilation.

Assume that black pixel is marked with "1" and white pixel is marked with "0" in a binary image. The image dilation operation is to expand the region of black dots by a local neighborhood operation as shown in FIG. 3B. The center pixel "o" at the output is set to "0" only when all neighboring pixel $X_I$ in a 3×3 window, where I=1, . . . 8, are matched with the 3×3 zero mask. Otherwise, the center pixel "o" at the output is marked with black pixel, "1". The dilation operation is required because in some documents the text is printed with dot-matrix. The dilation operation connects the adjacent small dots into line segments so that the noise dots and the dots belonging to dot-matrix characters becomes distinguishable. A graphical example is illustrated in FIG. 3C and FIG. 3D. FIG. 3C displays a binary image before image dilation. The number and size of the black dots in the left-handed side of the image is identical to the one in the right-handed side. If the number (or the area) of the noise dots is taken as a feature to evaluate level of noise, the feature will fail to differentiate the image patterns in both sides. However, after image dilation is applied, the original dotted pattern is turned into two straight line segments in the left-handed side as shown in FIG. 3D. The dispersed noise patterns in the right handed side of the image stays the same except the enlarged noise dots. Hence, the number of noise dots becomes a useful feature in extracting real noise dots in the evaluation of noise level in the dilated binary image.

Figure 3E:
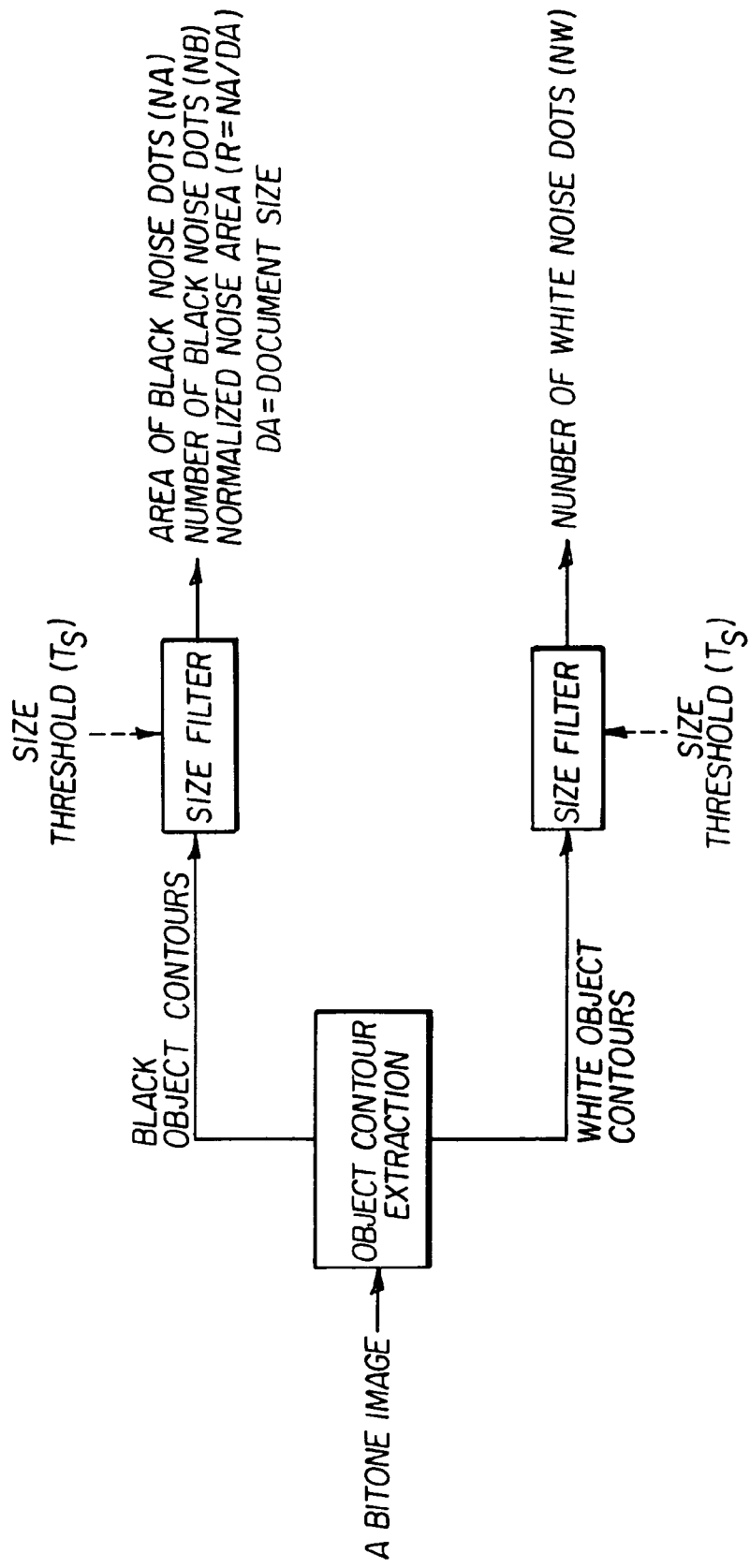
FIG. 3E is the image processing block diagram of noise feature extraction.
Figure 3F:
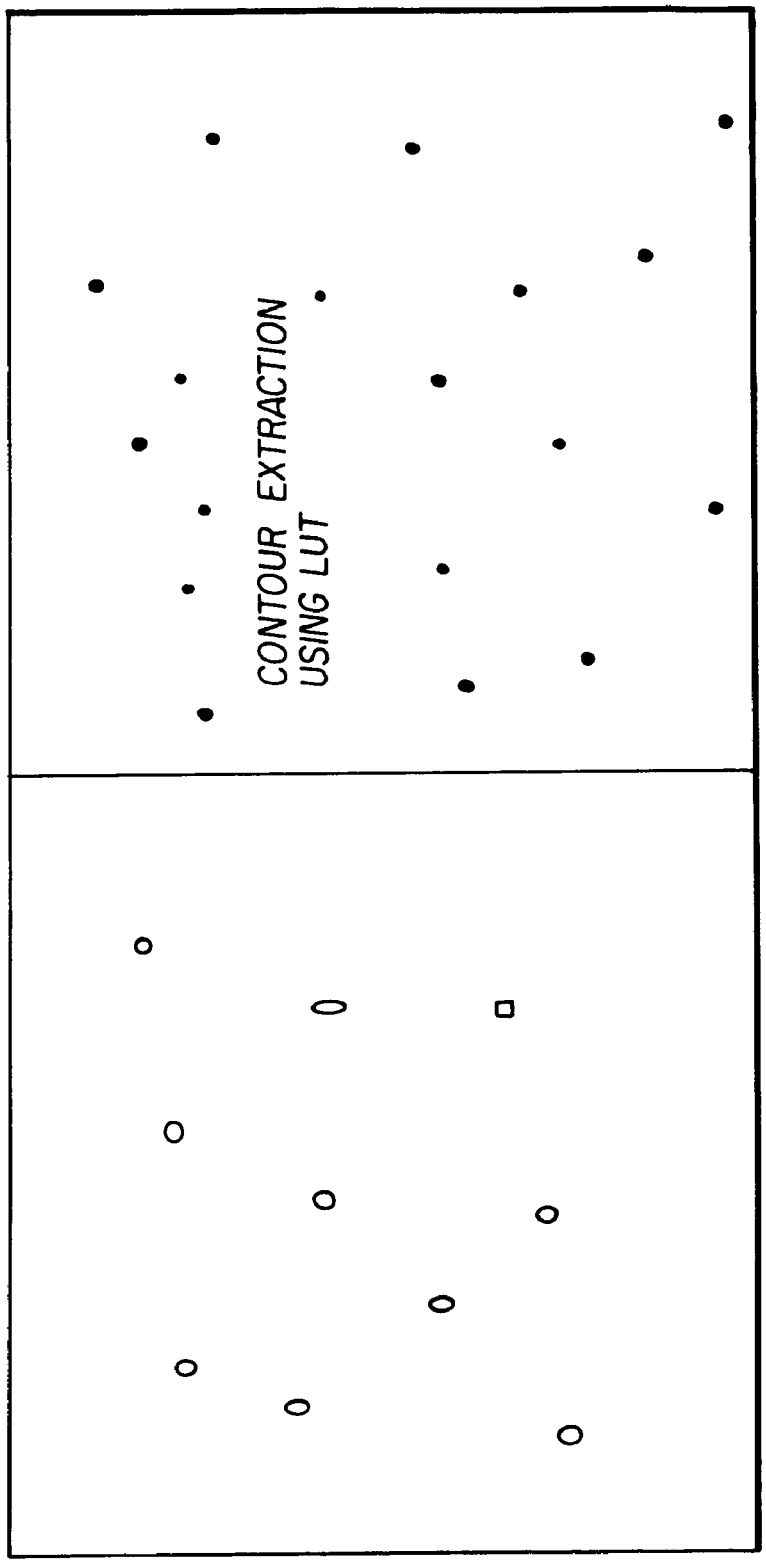
FIG. 3F is an example of noise feature calculation in a binary image.

The randomly, distributed small dots which contain no image information in a binary image are defined as noise. The noise measurement requires counting the number and the area of the small dots in a binary image. FIG. 3E depicts the processing steps of noise measurement on the dilated binary image. First, it applies to a contour tracing method (see reference in U.S. Pat. No. 5,974,199, the disclosure of which is hereby incorporated by reference) to extract the outline of every object in the dilated binary image. The contour pixels are extracted either in a sequence of clockwise or counterclockwise. The contours extracted in the order of clockwise are the outer contour (or black object contours), and the contours extracted in the order of counterclockwise are the inner contours (or white object contours). A size threshold ($T_s$) is applied to reject the large contour components whose size is too large to be considered as noise dots. The numbers of the remaining small contours are counted for black noise dots (NB) and white noise dots (NW), respectively, and the total noise area (NA) for black noise dots is calculated. The normalized noise area (R) is the ratio of NA value over the document area (DA) and is taken as the image noise index (INI) The NB and NW values are used to differentiate the white background from the black background. When the NB is greater than the NW, it indicates that the image has a white background. A large NW value then indicates that the background is black. This occurs when there is a con-tone image or large dark gray area existed in the document. FIG. 3F is an example of the calculation of noise features. There are 20 black noise dots counted. That is that NB equals to 20. The number of white noise dots (NW) is counted as 10. Assume that the average area of each noise is calculated as Na, then the total noise area (NA) is 20 times Na and the image noise index (INI) is equal to NA/DA.

The image noise index (INI) is used to judge the noise level of a binary image. When the INI value is below a specified threshold (ITH), the image is considered as good binary image. That means the binary image is legible and the background is clean. When it is greater than the ITH, it is classified as a noise binary image. The document is required to rescan or the gray scale image is retrieved if available for automatic image quality correction.

Automatic Image Quality Correction

Figure 4A:
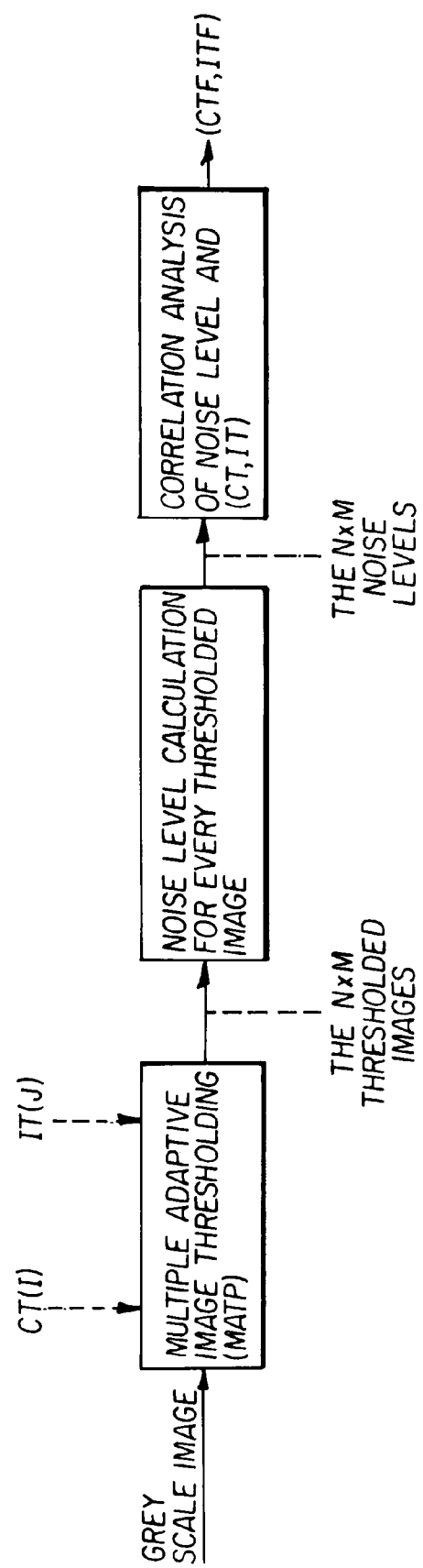
FIG. 4A shows the block diagram of the image processing for automatic image quality correction.
Figure 4B:
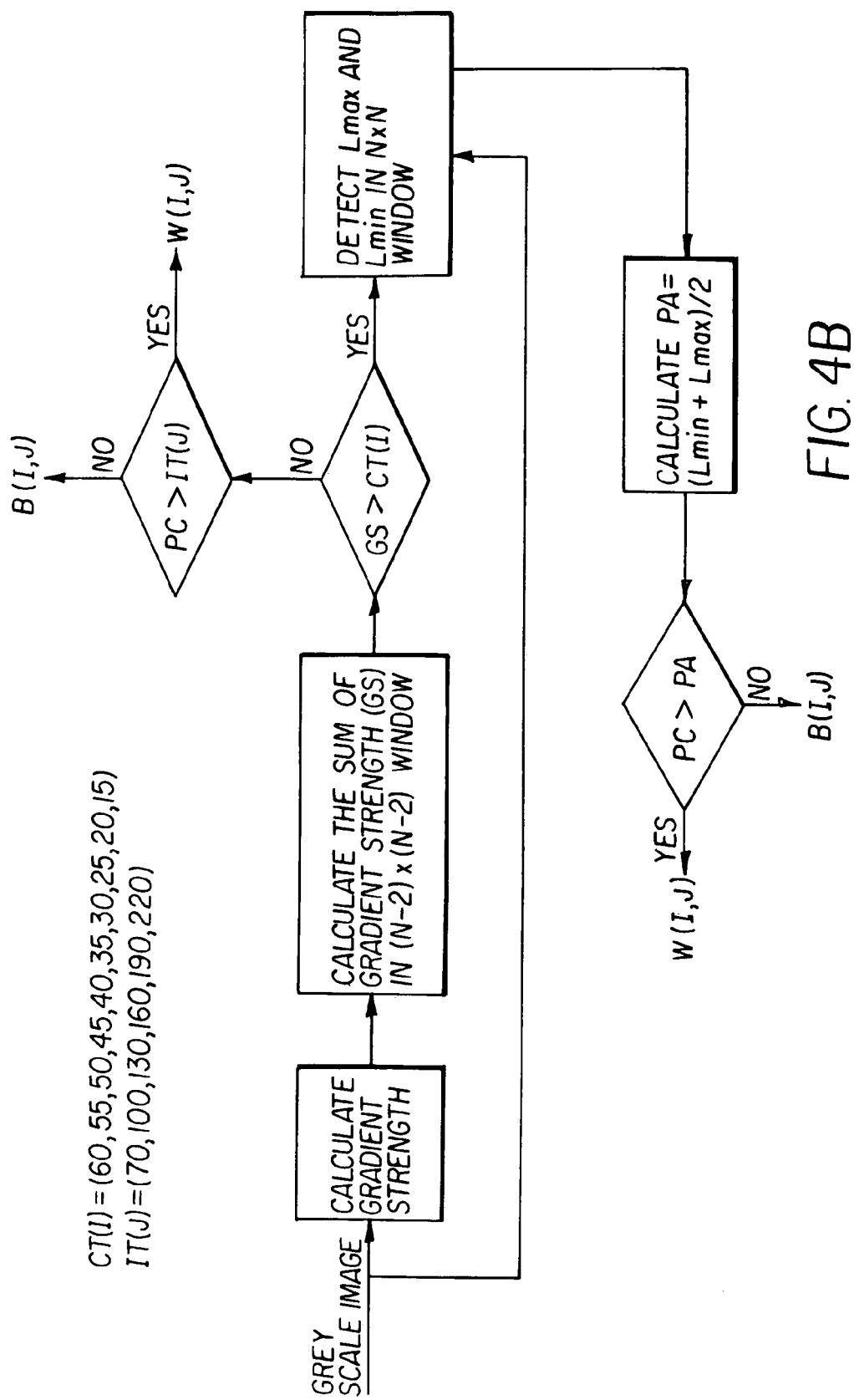
FIG. 4B shows the block diagram of the image processing for the multiple adaptive image thresholding.

FIG. 4A shows the block diagram of image processing for automatic image quality correction. A multiple adaptive image thresholding process is applied to produce (N+M) binary images by orderly change of the N different contrast and the M different intensity threshold parameters. The noise level of every binary image in the (N+M) thresholded image is calculated, respectively. The optimal threshold parameters is obtained from the (N+M) pair of threshold values by analyzing the correlation of the (N+M) noise levels and the (N+M) pairs of contrast and intensity thresholds.

The basic processing steps of the multiple adaptive thresholding are the same as the one in FIG. 2A except with the multiple input of threshold values (CT, IT). The input (CT, IT) values are changed with 5 units decrement of CT and 30 units increment of IT in order of (60,70), (55,70), (50,70), (45,70), (40,70), (35,70), (30,70), (25,70), (20,70), (15,70), (60,100), (60,130), (60,160), (60,190) and (60,220). The 15 pairs of threshold values are fed into the adaptive thresholding process sequentially and generate 15 different binary images. By applying the process of noise feature extraction to the 15 different images separately as shown in FIG. 3A, there are 15 noise values, R(CT,IT), calculated and listed in FIG. 4C. FIG. 4C shows noise levels at various combinations of (CT, IT).

Figure 4D:
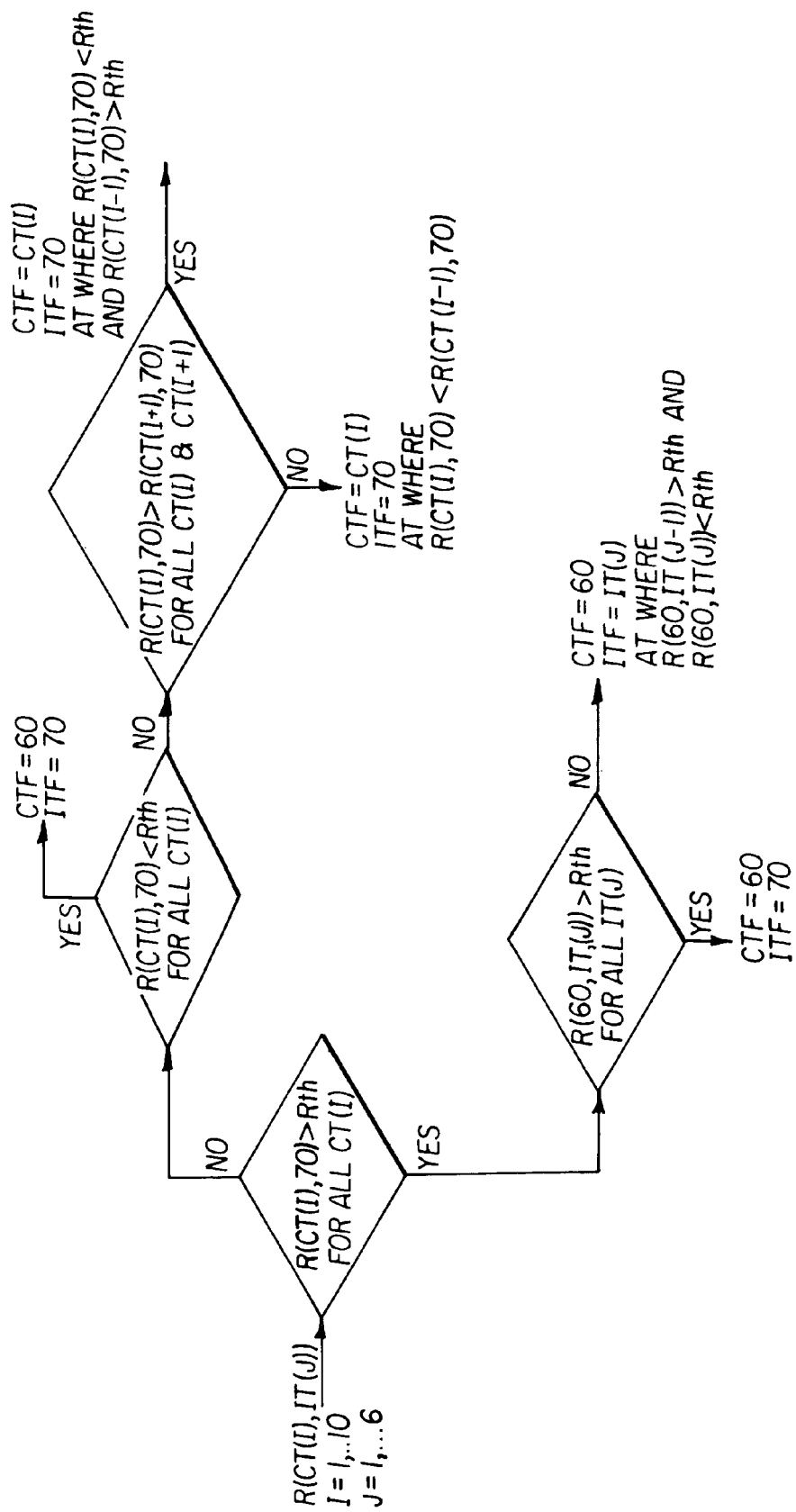
FIG. 4D is a flow chart of noise level analysis in finding the optimal contrast threshold and intensity threshold.
Figure 4E:
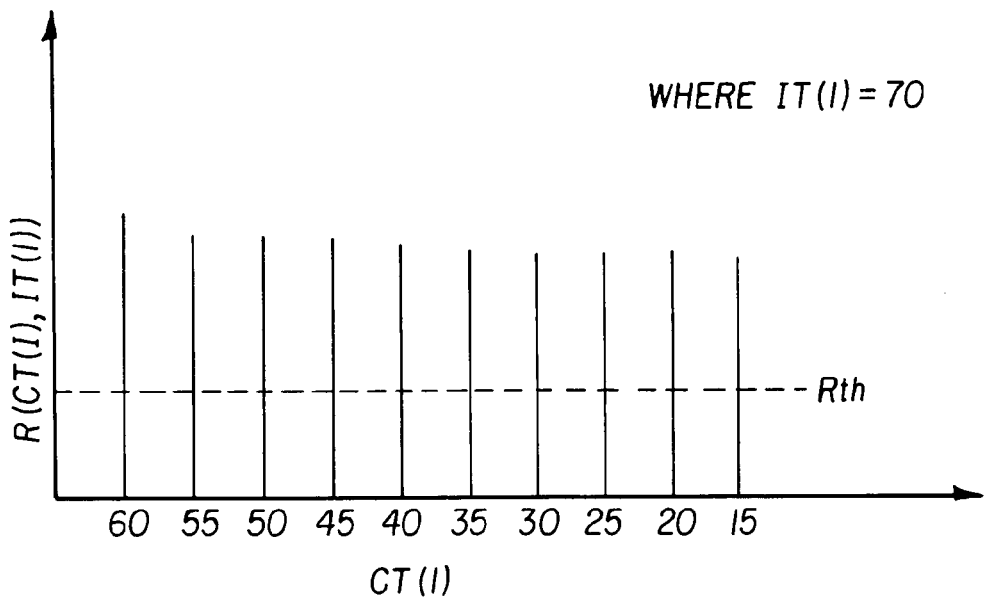
FIG. 4E is the first example of noise index distribution (R(CT,IT)) with constant intensity threshold (IT) at 70 and multiple contrast thresholds (CT) varied from 60 to 15.

The objective of correlation analysis of noise and (CT,IT) is to identify the threshold values (CT, IT) which will be used in the adaptive thresholding process in generating least background noises while retaining all image information in a thresholded image. FIG. 4D is the block diagram of the data analysis of selecting the optimal threshold values. First, scanning through the set of noise values, R(CT(I),70), where I=1, . . . , 10, if the condition (A): R(CT(I),70)>Rth for all CT(I), is met, where the Rth is a predefined noise threshold value (Rth) as shown in FIG. 4E. This indicates that the noise levels of all thresholded images are high and unrelated to the change of contrast threshold. Hence, it requires the change of intensity threshold (IT) in search of the optimal intensity threshold. On the other hand, if the condition (A) fails, it requires the change of the contrast threshold (CT) in search of the optimal contrast threshold.

Figure 4F:
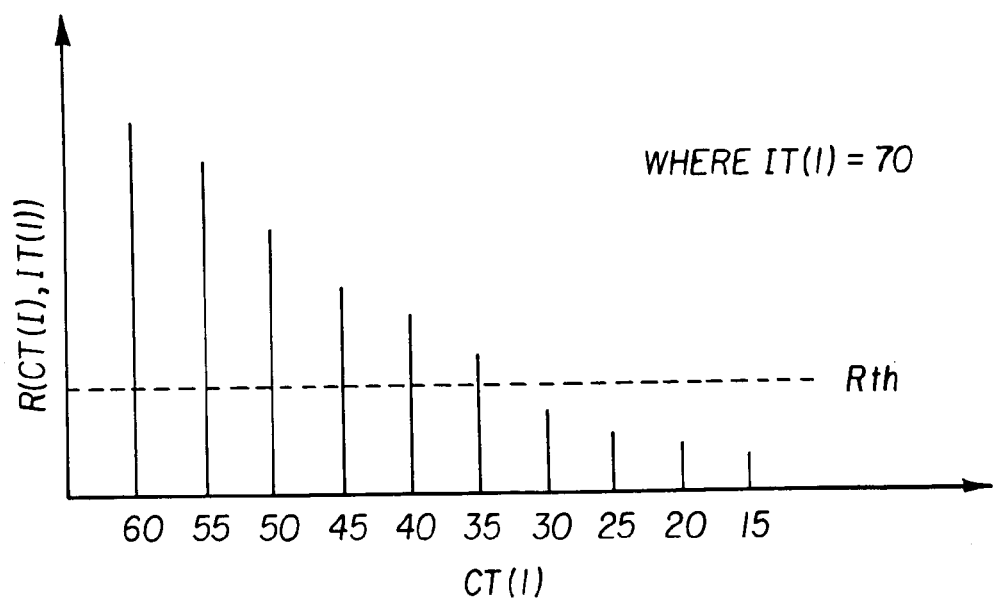
FIG. 4F is the second example of noise index distribution (R(CT,IT)) with constant intensity threshold (IT) at 70 and multiple contrast thresholds (CT) varied from 60 to 15.
Figure 4G:
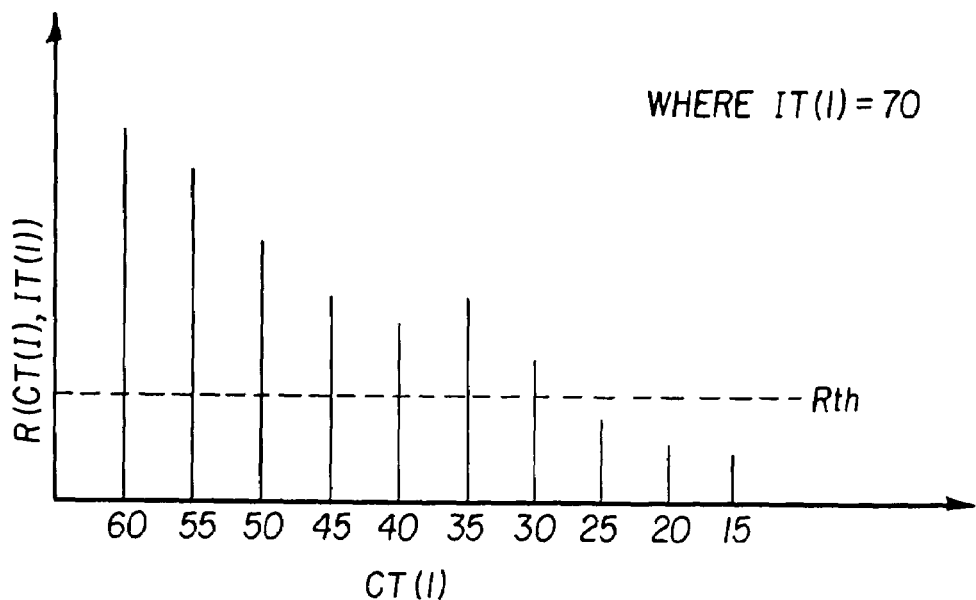
FIG. 4G is the third example of noise index distribution (R(CT,IT)) with constant intensity threshold (IT) at 70 and multiple contrast thresholds (CT) varied from 60 to 15.

In the search of optimal contrast threshold, if the condition (B): all of the noise values, R(CT(I),70), I=1, . . . , 10, are smaller than the noise threshold (Rth) as shown in FIG. 4E, it indicates that the starting threshold setting at (CT,IT) =(60,70) generates little background noises and the final threshold values (CTF,ITF)=(60,70) are taken as the optimal threshold values. Otherwise, by examining the array of R(CT(I), 70) data, if the condition (C) : R(CT(I), 70)>R(CT (I+1), 70), I-1, . . . , 9, is satisfied, the final threshold values (CTF,ITF)= (CT(I) 70) is selected at where the CT(I) meets the condition: R(CT(I), 70)<Rth andR(CT(I+1), 70)>Rth. As the example shown in FIG. 4F, the CT(I) value is selected at 35 and the final threshold values (CTF,ITF)=(35, 70). If the test of the condition (C) fails, the final threshold values (CTF,ITF)=(CT(I), 70) is selected at where the CT(I) meets the condition: R(CT(I), 70)<R(CT(I−1), 70). As the example shown in FIG. 4G, the CT(I) value is selected at 40 and the final threshold values (CTF,ITF)=(40, 70).

Figure 4H:
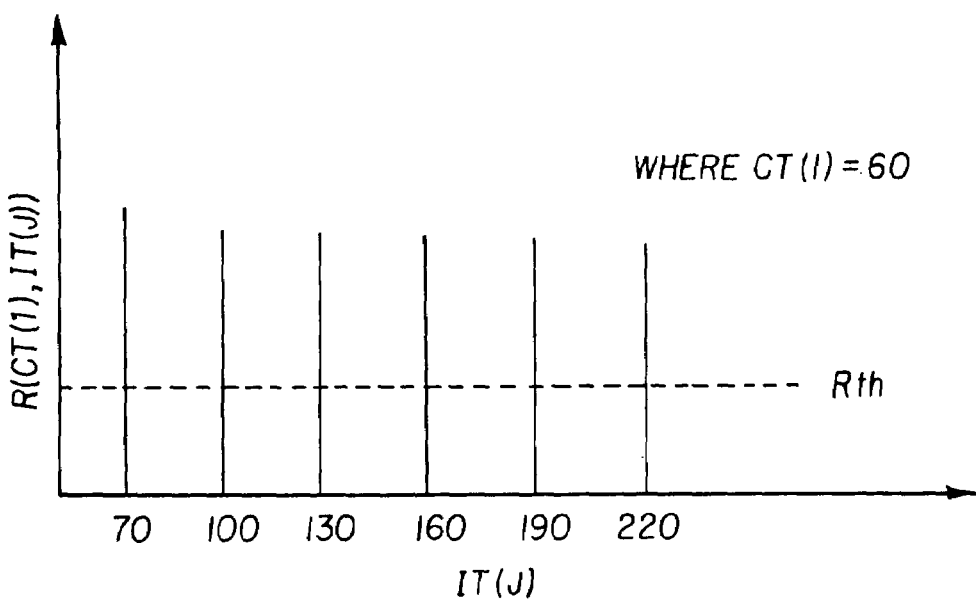
FIG. 4H is an example of noise index distribution (R(CT, IT)) with constant intensity threshold (IT) at 60 and multiple contrast thresholds (CT) varied from 70 to 220.
Figure 41:
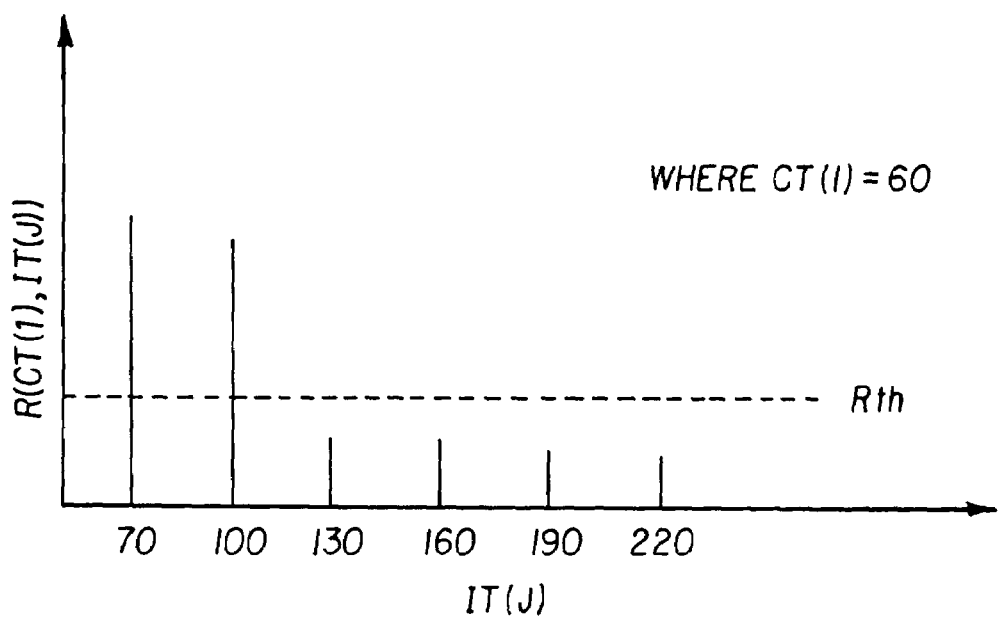

In the search of optimal intensity threshold, if the condition (D): R(60,IT(J))>Rth for all IT(J),J=1, . . . , 6, is met, it indicates that the noise levels of all thresholded images are high and unrelated to the change of intensity threshold as the example shown in FIG. 4H. The final threshold values (CTF,ITF) is set at (60, 70) which is the starting setup. This implies that there is no optimal threshold values detected and the final threshold values are assigned with the starting setting, (CTF,ITF)=(60, 70). On the other hand, if the test of the condition (D) fails, the (CTF,ITF)=(60,IT(J)) is selected at where R(60, IT(J− 1))>Rth and R(60, IT(J))<Rth. As the example shown in FIG. 4I, the IT(J) value is selected at 130. This indicates the intensity threshold at IT(J−1)=100 is close to the background intensity and it is incapable of thresholding the intensity levels of background pixels and results in generating large amount of background noises.

What is claimed is:

1. An imaging process for producing a clean, readable binary image of a scanned document comprising the steps of:
   a. digitally capturing a document as a gray scale image;
   b. performing an image adaptive thresholding process to convert the gray scale image into a binary image;
   c. inspecting the binary image by counting a number of noise dots to create an image noise index value indicative of the amount of undesirable image artifacts or image information loss;
   d. determining whether the image noise index is equal to or greater than a predetermined threshold value; and
   e. performing an image correction process to produce a readable, clean binary image when said image noise index value is determined to be equal to or smaller than said threshold value.

2. An imaging process for producing a clean, readable binary image as set forth in claim 1, wherein the image correction process comprises digitally capturing the document as a new gray scale image followed by repeating steps b.)–e.) until the image noise index value falls below the predetermined threshold value.

3. An imaging process for producing a clean, readable binary image as set forth in claim 1, further comprising the step of storing the gray scale image and the image correction process comprises retrieving the gray scale image from storage followed by repeating steps b.)–e.) until the image noise index value falls below the predetermined threshold value.

4. An imaging process for producing a clean, readable binary image as set forth in claim 1, wherein the step of determining comprises comparing the image noise index for an image with a predetermined threshold value selected to generate the least background noise while retaining all the image information on the gray scale image wherein when the image noise index value is at or above the predetermined threshold value the gray scale image is determined to be a noisy binary image requiring correction.

5. An imaging system for producing a clean, readable binary image of a scanned document comprising:
   a. means for digitally capturing a document as a gray scale image;
   b. means for performing an image adaptive thresholding process to convert the gray scale image into a binary image;
   c. inspection means for the binary image to create an image noise index value by counting a number of noise dots indicative of the amount of undesirable image artifacts or image information loss;
   d. processing means for comparing the image noise index for an image with a predetermined threshold value; and
   e. processing means for performing an image correction process to produce a readable, clean binary image when the image noise index is equal to or greater than the predetermined threshold value.

6. An imaging system for producing a clean, readable binary image as set forth in claim 5, wherein the processing means for image correction comprises a means to digitally capture the document as a new gray scale image and means for repeating the inspection and correction of the image by the means b.)–e.) until the image noise index value falls below the predetermined threshold value.

7. An imaging system for producing a clean, readable binary image as set forth in claim 5, further including means to store the gray scale image and wherein the processing means for image correction comprises means for retrieving the gray scale image from storage and means for repeating the inspection and correction of the image by the means b.)–e.) until the image noise index value falls below the predetermined threshold value.

8. An imaging system for producing a clean, readable binary image as set forth in claim 5, wherein the processing means for comparing the noise index comprises means for comparing the image noise index for an image with a predetermined threshold value selected to generate the least background noise while retaining all the image information on the gray scale image wherein when the image noise index value is at or above the predetermined threshold value the gray scale image is determined to be a noisy binary image requiring correction.

* * * * *